United States Patent [19]

Owen et al.

[11] 4,235,484
[45] Nov. 25, 1980

[54] BEARING CARRIER WITH INTEGRAL LUBRICATING SEALING FEATURES

[75] Inventors: Bruce R. Owen, Indianapolis; Charles R. Sarle, Noblesville, both of Ind.

[73] Assignee: Wallace Murray Corporation, New York, N.Y.

[21] Appl. No.: 13,974

[22] Filed: Feb. 22, 1979

[51] Int. Cl.³ ............................................. F16C 33/10
[52] U.S. Cl. ................................... 308/122; 308/240; 308/DIG. 15; 184/6.11
[58] Field of Search ..................... 308/122, 121, 134.1, 308/240, DIG. 15; 184/6.11, 6.18

[56] References Cited

U.S. PATENT DOCUMENTS

| | | | |
|---|---|---|---|
| 3,043,636 | 7/1962 | MacInnes et al. | 308/121 |
| 3,090,544 | 5/1963 | Woollenweber, Jr. et al. | 308/122 |
| 3,411,706 | 11/1968 | Woollenweber, Jr. et al. | 308/121 |
| 3,993,370 | 11/1976 | Woollenweber | 308/121 |
| 4,128,283 | 12/1978 | Palmer | 308/121 |

FOREIGN PATENT DOCUMENTS

1255610 1/1961 France ............................ 308/DIG. 15

Primary Examiner—Richard R. Stearns
Attorney, Agent, or Firm—Thomas J. Greer, Jr.

[57] ABSTRACT

A bearing carrier for high speed rotating machinery, such as a turbocharger, wherein lubricant is supplied under pressure and is drained by gravity. The primary feature is the forming of the bearing housing with a very large drain chamber which is obstructed only by a lubricant supply boss supporting a central housing portion in which a sleeve bearing is resiliantly mounted. Lubricant exiting from the ends of the sleeve bearing is flung circumferentially away from the rotating components and drains naturally to a lower portion of the drain chamber where it flows through a drain passage port without re-entering the rotating components or piston ring seal area. The drain port is so positioned with respect to the lubricant drain chamber and there is provided a dam around the seal area at the axial end of the lubricant drain chamber whereby the machinery may be selectively positioned with the shaft horizontal, within 10° from the vertical or in intermediate positions and whereby there is effective draining of the lubricant from the machinery without flooding of the seals between the rotating components and the housing which would cause undue lubricant loss along the shaft.

8 Claims, 8 Drawing Figures

BEARING CARRIER WITH INTEGRAL LUBRICATING SEALING FEATURES

This invention relates to high speed rotating machinery, such as a turbocharger. The invention exhibits utility in the housing carrying the bearings. The housing configuration has features which enhance the sealing of lubricant. This lubricant sealing feature also allows mounting of the machinery such that the shaft thereof may be positioned selectively horizontally, vertically, and intermediate positions therebetween.

Machinery of the general type to which this invention relates is provided with a pressurized lubricant supply. As the lubricant exits from the bearings, it enters into a lubricant drain chamber from which it drains by gravity through a drain passage and returns to the source of pressurization. Customarily, the machinery has been mounted with the shaft generally horizontal and the drain passage being substantially vertical.

The shaft of this general machinery class extends beyond both ends of the lubricant drain chamber with one end carrying for example, a fan, impeller or gear. The opposite end may carry a propulsion device such as a V-band pulley, a gear or a direct drive coupling from an external power source. In the specific case of turbochargers, one shaft end carries a compressor wheel for pressurizing air and the opposite end carries a turbine wheel for propulsion derived from the energy of engine exhaust gases. There are specific constructions using only one shaft end extending from the lubricant drain chamber such as an overhung bearing system for a turbocharger in which both turbine and compressor wheels are carried back-to-back on one shaft end.

The sealing of these shaft extensions to prevent lubricant flow from the bearing carrier or bearing housing to atmosphere or to other components of the machinery has assumed many forms in the prior art. These include labyrinth seals, lip seals, mechanical face seals and external source pressurized seals along with piston rings which are least effective for oil. A stationary piston ring engaged with an exit bore of the bearing housing, in combination with a groove in the rotating shaft, is primarily a gas seal. Piston ring seals are predominant in current turbocharger constructions and are used to seal the pressurized air on the compressor side and the hot corrosive gases on the turbine side from entering the bearing housing. These piston rings do not assure lubricant sealing under all conditions even when many prior art devices have aids for the piston rings. The lubricant must be kept away from the piston ring as any film, foam, or splash entering the seal area will leak out. Some of the prior art aids are deflectors, pumping grooves and holes, flingers and channels or duct work passages directing the lubricant to the oil drain. The construction of these aids and their bearing housings is such that the lubricant will repass the rotating components on its way from the bearing housing. Any repassing of the lubricant over the rotating components promotes foaming and spray which is extremely difficult to seal. Minor leakage is tolerated in present turbochargers due to the high cost of leak stoppage devices. Even the current aids in present turbochargers are costly, but relatively less expensive than, for example, a mechanical face seal. The other reason for the acceptance of a piston ring seal is that at very high speeds, rapid wear of contact seals makes maintenance very costly and the frictional drag of the seals lower unit efficiency.

It will be appreciated from the previous discussion that, in a turbocharger, the piston ring area would be flooded when the shaft is in a vertical condition and the lubricant discharge into the drain area is parallel to the shaft. Lubricant collecting in the lowermost drain chamber also would flood this seal area resulting in excessive leakage.

A study of prior art and the previously discussed complex and costly sealing arrangements will make clear the advantages of the bearing carrier constructed in accordance with this invention.

A primary function of this invention is the provision of a bearing carrier or bearing housing utilizing piston ring gas seals, while stopping the lubricant leaks which often occur in conventional devices. This is accomplished without addition of costly and complex aids. A bearing housing is defined having a substantially unobstructed drain chamber from which the lubricant can seek its own natural path to the drain passage without repassing the rotating components after its initial exit from the bearings. The rotating components themselves provide the propulsion and direction for the lubricant to reach this unobstructed drain chamber. The bearing housing consists of an essentially circular outer portion with pilot diameters on either end for attachment of other machine components. The central portion of the housing is the bearing carrier and there is a generally open drain chamber between the outer and central portions of the housing. The only obstruction to the drain is a boss connection between the two housing portions which carries the lubricant supply from an external source to the central bearing carrier. The drain passage is carried in the outer portion and opens through the drain chamber. The central portion has the bearing carrier open at both ends with one end opening into an oil drain slot in communication with the drain chamber. Adjacent to this slot and opposite from the bearing carrier end is a housing exit bore for receiving a piston ring. On the end opposite the oil drain slot another machine component attaches to the bearing housing which defines and closes the lubricant drain chamber. This open space is also essentially unobstructed and the component carries the other exit bore for receiving a piston ring. The rotating components are provided with shoulders defining a passage in close proximity to the central portion bearing carrier open ends. These shoulders are parallel to the ends and larger radially than the bearing bore walls. This passage provides the primary flinging action for the lubricant directing it radially into the open drain chamber to seek its natural path to the drain passage. If there is any minor splash back of the lubricant toward the rotating components, a secondary flinging groove directly adjacent to the primary flinging passage is carried in the bosses defining the shoulders. This secondary flinging action again directs the lubricant radially outwardly into the drain chamber. The piston ring seal area is kept dry and leak-proof due to the open area providing a drain chamber large enough and unobstructed to permit flinging action to be effective in stopping the repassing of lubricant across the rotating components carrying the piston rings. Prior art devices while having flinging action did not provide the space in the housing to prevent bounce back onto rotating components or reflow past the piston ring areas.

The bearing housing can be cast without cores being utilized. In this case, the lubricant supply boss would be linked to the drain chamber wall which carries the exit bore. When the oil drain slot is machined so as to communicate with the drain chamber, the flinging action through the slot would be obstructed in the area where the boss passes over the slot while running towards the exit bore wall. This obstruction still allows in excess of 240° open flinging into the drain chamber. To obtain full 360° open flinging, a small core can be used in the casting process to clear the obstruction between the lubricant supply boss and the forementioned drain chamber wall. On the side opposite the oil drain slot, full 360° flinging is always available due to the open space in the closure component.

Relating the invention specifically to turbochargers, the retained piston ring seals are very effective gas seals. The turbine section is always pressurized with respect to the bearing housing interior, thus the slight leakage of gas works against lubricant leakage. The compressor however, has conditions of both pressure and vacuum. The vacuum condition tends to pull oil through the piston ring seal. The invention as described will function without leakage in low level vacuum (4 inches of Mercury) such as encountered with an extreme air cleaner restriction on the compressor inlet. Higher levels of vacuum (up to 23 inches of Mercury) such as encountered with a carburetor on the compressor inlet require a vent seal. This vent seal is described in U.S. Pat. Nos. 3,077,296 and 3,834,156 assigned to the assignee of the present invention. To adapt the invention to previous patents of the vent seal, the bearing housing closure component carries the vent seal connection between the turbocharger and a dry portion of the engine. A flat plate is attached to the closure component between the rotating component flinging groove and the piston ring area so as to define a vent passage (as described in the aforementioned patents) within the drain chamber. In high vacuum conditions, the vent allows gases rather than the lubricant to be pulled through the piston ring. The flat plate acts as a true deflector as any splash from flinging action goes into the open drain chamber. It does not define a duct or channel for the lubricant.

In accordance with this invention, the housing of the machinery at the axial end of the lubricant drain chamber which is intended to be lowermost when the shaft is disposed substantially vertically, is configured so as to include a projection of the exit bore wall which extends axially into the lubricant drain chamber. Further, the drain passage is shifted axially of the housing so it is now disposed generally at the end of the lubricant drain chamber which will be lowermost when the shaft is disposed substantially vertically. The projection extends axially of the shaft into the housing beyond a portion of the drain passage whereby when the shaft is disposed vertically and defines a dam about which the collected lubricant readily flows and which dam is higher than the drain passage so that lubricant flows out of the drain passage without being directed toward the seal.

Another feature of the invention is that the drain chamber for the lubricant is configured adjacent the dam and remote from the drain passage so as to be generally semicircular and thus provide for free flow of lubricant around the shaft. Further, in alignment with this semicircular portion of the drain chamber, the shaft carries a flinger which directs the lubricant that passes out of the adjacent end of the bearing into the semicircular passage, thereby providing a flow action preventing carbon buildup and at the same time directing the lubricant away from the seal.

This invention most particularly relates to a turbocharger adapted for a passenger automobile use. Prior developed turbochargers had an oil drain disposed perpendicular to the shaft and there was a maximum variation of plus or minus 20° from the horizontal for an effective gravity drain for the oil without creating a possible low idle leak at the seals. In accordance with this invention, there has been developed a turbocharger which has the capability of being mounted with the shaft center line position ranging from horizontal up to 10° from vertical with respect to the oil drain. This range is with the turbine outlet down while approaching vertical. This leaves exhaust gas to the vehicle exhaust system oriented in a direction minimizing piping bends and makes the compressor discharge to engine intake a much cleaner interface. This versatility also allows the turbine section to be mounted lower, keeping the heat away from top mounted engine compartment components and the vehicle hood. When the carburetor is upstream of the compressor, the compressor section cannot be below the intake manifold level due to fuel puddling which causes exhaust emission level problems. A horizontal type mounting thus becomes a high mount with the additional height of the carburetor and accessories above the shaft center line. The vertical mount will lower this considerably due to the diffuser face in the compressor section becoming the lowest point to line up with the intake manifold.

The above referenced to mounting range was accomplished by first moving the oil drain passage in the bearing housing as close to the turbine housing as possible. The turbine end seal continues to be the conventional piston ring type. Oil leaving the bearing is flung out parallel to a shaft shoulder and seepage or splash back past the shoulder goes into a shaft groove for a secondary flinging action. In the turbocharger of this application, the drain chamber is open in a U-shape configuration wrapped around the bearing area and the oil drain slot is open to the drain chamber except where the lubricant supply boss comes through to the bearing bore. This large open area allows the oil to fling out and drain without running over the shaft. In the substantially vertical position, the piston ring bore of the housing is high enough over the drain chamber wall so as to form a dam which routes the draining oil to slide around the bore to avoid flooding the piston ring seal.

It has also been found desirable to mount turbochargers for off-highway applications in substantially vertical positions, with the difference being that the majority of these applications have the exhaust systems mounted to discharge exhaust upwardly. Thus, the turbocharger is beneficially mounted in a substantially vertical position with the compressor section disposed lowermost. It has been found that by slightly modifying the bearing housing and the closure plate of the compressor section end, efficient draining of lubricant from the turbocharger can be effected even when it is disposed in a substantially vertical position with the compressor section disposed lowermost.

Figure 1:
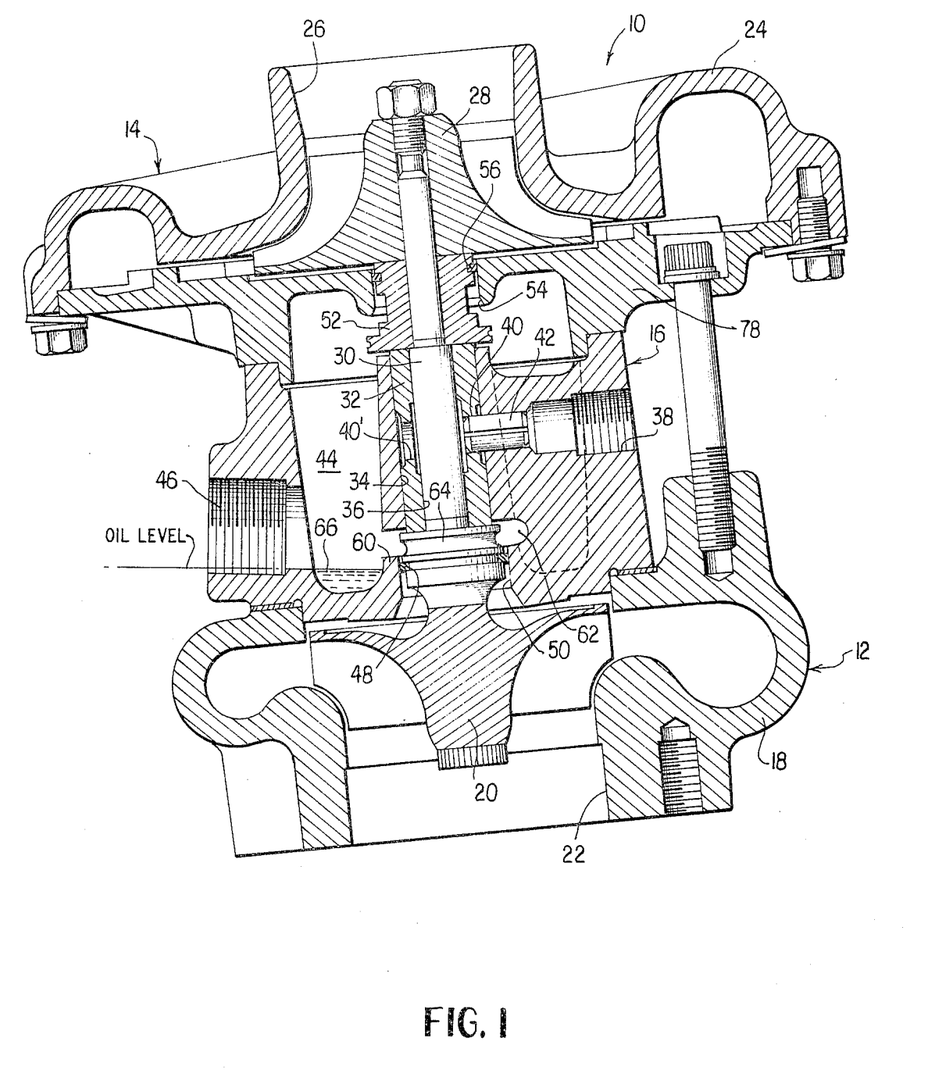
FIG. 1 is an axial cross-sectional view through a representative turbocharger showing the specific lubricant flow and drain passages including the dam.
Figure 2:
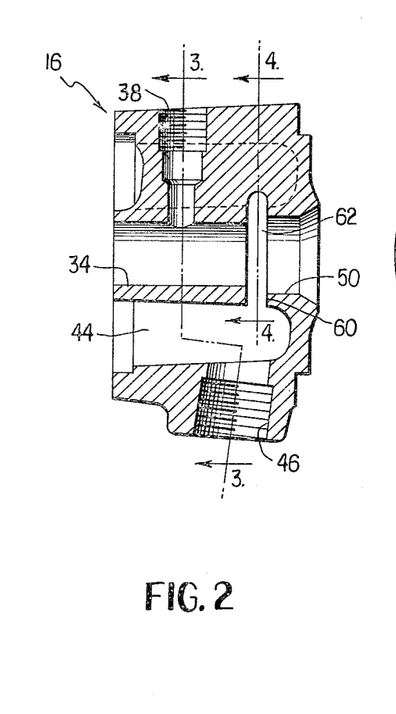
FIG. 2 is an axial cross-sectional view through the bearing housing per se and most specifically shows the internal details thereof.

In the drawings, referring now to FIG. 1, the turbocharger is generally denoted by the numeral 10. The turbocharger includes a turbine section 12 and a compressor section 14 separated by a bearing housing 16.

The turbine section 12 includes a housing 18 through which exhaust gases are radially fed to a turbine wheel 20 causing rotation of the turbine wheel. The gases exit the turbine wheel axially through an outlet 22.

The compressor section 14 includes a housing 24 having an axial air inlet 26 for a compressor wheel 28.

The turbine wheel 20 and the compressor wheel 28 have a common shaft 30 with an intermediate section generally within a sleeve bearing 32 which is received within a central axial bore 34 in the bearing housing 16. The sleeve bearing 32 has a bore 36 therethrough in which the central portion of shaft 30 is rotatably journalled and thus functions as a radial bearing.

The bearing housing 16 has a hole 38 for receiving lubricant from an external source under pressure. The hole 38 communicates with the axial bore 36 of the sleeve bearing through a clearance hole 40. A split hollow pin 42 is pressed into the aligned holes 38 and 40 so as to fix the sleeve bearing 32 against both rotation and axial movement within the bearing housing 16. The bearing 32 has a second hole 40' aligned with the hole 40 to to facilitate the removal of the pin 42.

Figure 3:
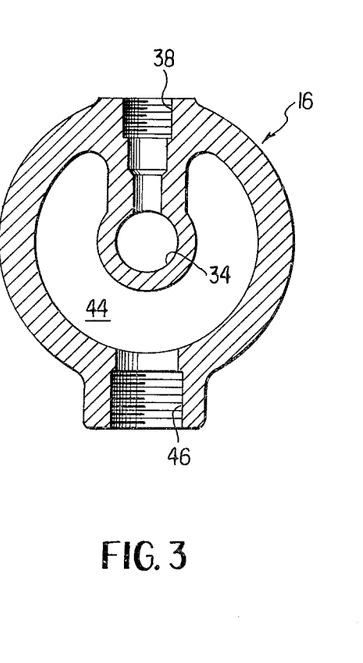
FIG. 3 is a transverse sectional view taken through the bearing housing generally along the line 3—3 of FIG. 2, the sleeve bearing and shaft being omitted.

It is to be noted that the bearing housing 16, in cooperation with a closure in the form of a compressor flange plate 78 forms a lubricant drain chamber 44. It is to be noted from FIG. 3 that the drain chamber 44 extends through an arc in excess of 240° about the portion of the bearing housing 16 having the bore 34 therein for receiving the sleeve bearing 32. Thus in the central portion of the bearing housing 16 there is adequate space for drainage of oil without the oil coming back into contact with the shaft 30. It is to be understood that the lubricant under pressure will flow along the shaft 30 in both directions and out of the ends of the sleeve bearing 32 into the lubricant drain chamber 44. Returning to FIG. 1, a drain passage 46 is formed through the bearing housing 16 into the lubricant drain chamber 44 adjacent to, but closely spaced from that axial end of the lubricant drain chamber 44 adjacent to the turbine section 12. It is to be noted that the drain passage 46 has an axis at an angle to the axis of the shaft 30 such that when the turbocharger is tilted at an angle to the horizontal in a counterclockwise direction, the axis of the drain passage 46 may assume a vertical position for the efficient draining of the drain chamber 44.

It will be readily apparent that when the turbocharger 10 is mounted with the shaft 30 being disposed horizontally, the lubricant flowing out of opposite ends of the sleeve bearing 32 will flow into the lower part of the lubricant drain chamber 44 and then through the drain passage 46.

As shown in FIG. 1, in order to prevent the flow of lubricant into the turbine section 12, a piston ring seal 48 is formed between the bearing housing 16 and the shaft 30. The piston ring seal 48 is mounted within an exit bore 50.

In a like manner, lubricant flow into the compressor section 14 is prevented by a thrust sleeve 52 mounted within an exit bore 54 in the compressor flange plate 78 and carrying a seal 56.

In accordance with this invention, the configuration of the lubricant drain chamber 44 is one wherein exit bore wall projection 60 is formed on the inner surface of the axial end wall of the bearing housing 16 so that the projection 60 extends into the lubricant drain chamber 44. The projection 60 extends axially beyond a part of the drain passage 46.

Figure 4:
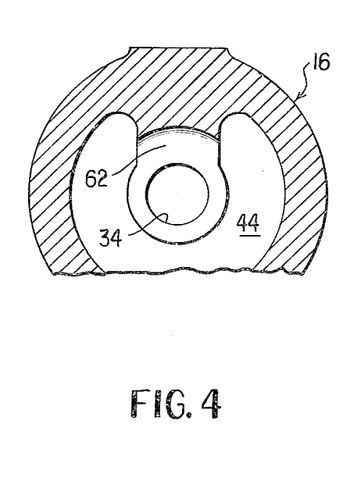
FIG. 4 is a fragmentary transverse sectional view through the bearing housing taken generally along the line 4—4 of FIG. 2 and shows the details of the machined oil drain slot.

In addition, the lubricant drain chamber 44 is formed remote from the drain passage 46 with an oil drain slot 62 that extends around the shaft 30 as is best shown in FIG. 4. A flinger 64 is carried by the shaft 30 and lubricant exiting out of the adjacent end of the sleeve bearing 32 contacts the flinger 64 that flings the lubricant in a circular pattern around through the oil drain slot 62 and into the main part of the lubricant drain chamber 44 without flowing back onto the shaft 30.

If FIG. 1, the turbocharger 10 is mounted with the shaft 30 in an upright position, 10° from the vertical. The lubricant level 66 is of course horizontal. It will be apparent that the projection 60 extends above the level 66 of lubricant within the lubricant drain chamber 44 and thus the projection 60 functions as a dam against the flow of lubricant towards the seal 48. At the same time, the slinger 64 flings the draining oil contacting it around the oil drain slot 62 and back into the main part of the lubricant drain chamber 44 for flow out of the drain passage 46 without recontacting the shaft 30. Thus, lubricant is constantly being flung away from the seal 48 and back into the main portion of the lubricant drain chamber 44 so that no more lubricant is directed toward the seal 48 when the turbocharger 10 has the shaft in a position 10° from the vertical than flows toward the seal 48 when the shaft is in a horizontal position.

Adjacent the compressor section 14, the drain chamber 44 is formed in part by the bearing housing 16 and in part by the compressor flange plate 78. It will be seen that the drain chamber 44 completely encircles the shaft so that oil exiting from the compressor end of the bearing 32 and engaged by the flinger portions of the thrust sleeve 52 will also be flung in a generally circular path so as to directly enter into the drain chamber 44 for drainage through the drain passage 46.

It is to be noted that the projection or dam 60 may be automatically formed without a core during the casting of the bearing housing 16 so that the dam is provided when the oil drain slot 62 is machined. This provides for a low cost construction. It is also to be noted that the customary carbon buildup will be accommodated better by the configuration of the lubricant drain chamber 44 due to the greater open area provided by the oil drain slot 62 which, as described above, also provides for the better flow of lubricant away from the seal 48. It will further be noted that the invention may be employed with a shaft bearing construction other than that specifically illustrated.

Figure 6:
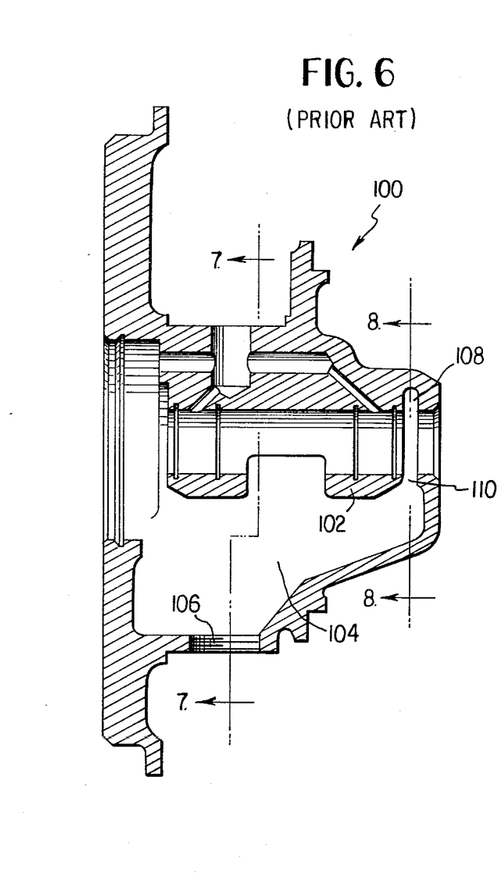
FIG. 6 is a longitudinal sectional view through a typical prior art bearing housing for a turbocharger.
Figure 7:
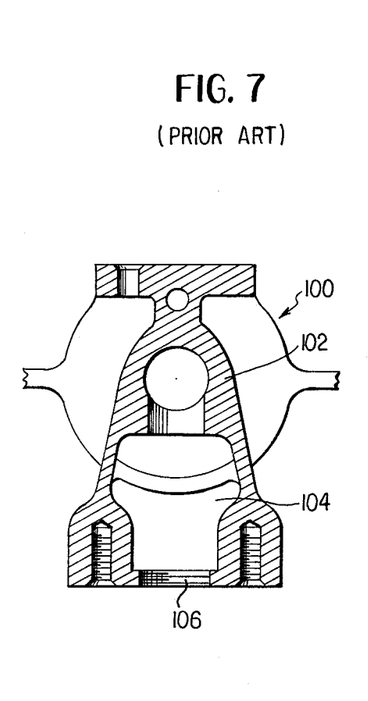
FIG. 7 is a fragmentary transverse vertical sectional view taken generally along the line 7—7 of FIG. 6 and shows the general cross-section of the drain chamber in the bearing mounting area.
Figure 8:
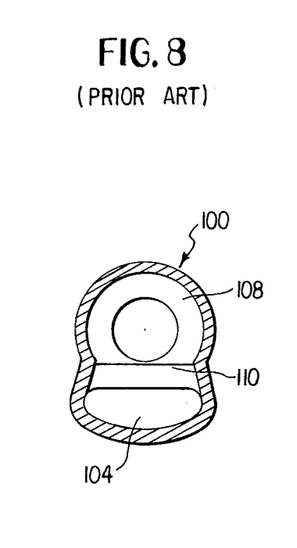
FIG. 8 is a transverse sectional view taken generally along the line 8—8 of FIG. 6 and shows the general details of a machined oil slot at the compressor end.

In order to fully appreciate the advantages of the above-described turbocharger construction, it is necessary to examine a typical prior art turbocharger bearing housing, as is shown in FIGS. 6, 7 and 8.

Most turbochargers are mounted on an engine by use of the turbine inlet foot with a slight trend towards the mounting on the bearing housing oil drain pad, as shown in FIG. 7. The shaft centerline is essentially horizontal when mounted on the vehicle. The oil drain is perpendicular to shaft with a maximum variation plus or minus 20° for an effective gravity drain for the oil without creating a positive low idle leak at the piston ring seals. Engine oil enters the bearing housing at the top and a multiplicity of drilled holes carries the lubricant supply to the bearings, the shaft being mounted in separately formed spaced bearings.

It is to be understood that the journalled bearings for the shaft are limited in axial movement by retaining rings at each end. The bearings rotate at about one-third of the shaft speed and are free to float radially on an oil film at the outside and inside diameters. A series of holes in the bearings allow the oil to flow to the shaft. Axial thrust is absorbed by a stationary thrust bearing fixed to the bearing housing. A thrust ring on each side of the thrust bearing rotating at shaft speeds completes the system. Axial movement is defined by a spacer between the thrust rings.

Referring more specifically to FIGS. 6–8, it will be seen that the bearing housing illustrated therein is generally identified by the numeral 100. The construction thereof is one wherein the upper part of the housing constitutes a bearing support 102 which occupies substantially all of the bearing housing, as is best shown in FIG. 7. The lower portion of the housing 100 defines a drain chamber 104 which is very small, as is clearly illustrated in FIGS. 7 and 8. The drain chamber slopes down to a lubricant drain port 106.

Gas is selected from entering the bearing housing on both the compressor and turbine ends by stationary piston rings (not shown). These rings are not oil seals. On the turbine end, oil is kept away from the piston ring by the shaft flinging action into a slot 108 which opens into the oil drain cavity or chamber 104. On the compressor end, oil leaving the thrust bearing is restricted by a fixed plate (not shown) forming a channel and orifice into the oil drain chamber. Any leakage past this plate is picked up by a rotating flinger sleeve (not shown) and thrown out into the drain chamber before reaching the ring seal.

It is to be understood that in the prior art turbocharger bearing housing arrangement, an insert (not shown) disposed adjacent to the compressor wheel holds the thrust bearing and oil deflector in position and closes the compressor end of the bearing housing while carrying a piston ring bore.

Returning now specifically to the turbocharger of this invention, the above-described mounting of FIG. 1 was accomplished by first moving the lubricant drain passage of the bearing housing as close to the turbine housing as possible. The turbine end seal is still a piston ring. However, lubricant leaving the bearing is flung out parallel to the shaft shoulder and any seepage past the shoulder goes into a shaft groove for a secondary flinging action. This escaping oil in the prior art turbochargers would still be free to flow over the shaft on the way to the drain cavity. This is due to the oil slot breaking into the drain cavity only on the bottom creating an orifice 110, and the slot runs without drain exits for approximately 250°, as is clearly shown in FIG. 8. In accordance with this invention, the drain cavity is opened in a U-shape configuration wrapped around the bearing area and the slot is open to the drain in excess of 240° as shown in FIG. 4. This large open area allows the oil to fling out and drain into the drain chamber without running over the shaft. In returning to FIG. 1, the vertical position, the projection 60 of the housing is high enough over the drain cavity wall so as to form a dam which routes the draining oil to slide around the boss to avoid flooding the ring seal.

The open drain cavity of this invention avoided the channelling of oil towards the drain by providing the space for the oil to seek its own natural way out without repassing the rotating parts after flinging action. Any repassing promotes foaming which is very difficult to seal. The open type bearing housing 16 also avoids extensive coring of the casting by splitting the compressor end flange 78 section into a separate part. As described above, this flange plate is also open around the ring boss to allow for flinging action to be effective.

Figure 5:
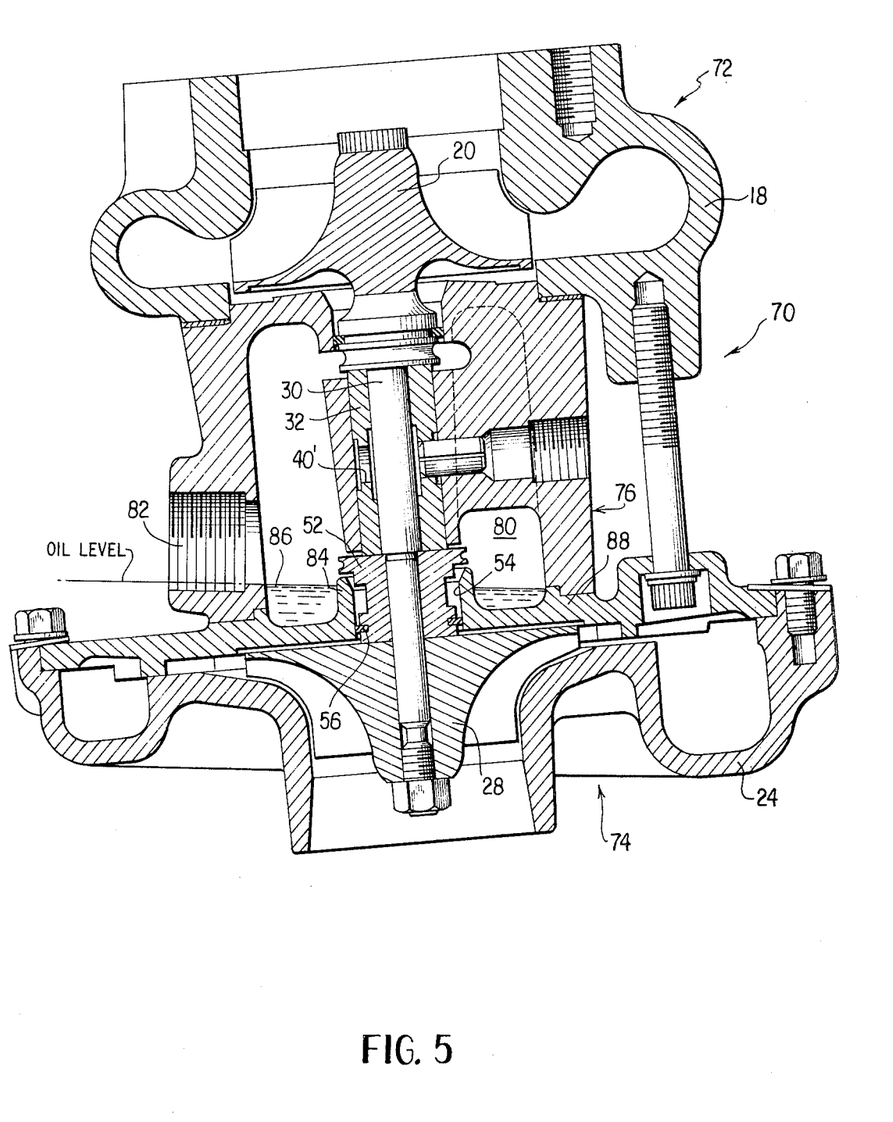
FIG. 5 is an axial cross-sectional view through a turbocharger formed in accordance with this invention and with the compressor section lowermost.

Reference is now made to FIG. 5 wherein there is illustrated a turbocharger particularly constructed for use in combination with diesel engines whose exhaust stacks extend upwardly. The modified turbocharger is generally identified by the numeral 70 and includes an uppermost turbine section 72 and a lowermost compressor section 74. The turbine section 72 and the compressor section 74 are separated by a bearing housing 76.

The turbine section 72, as in the case of the turbocharger 10, includes a housing 18 which has positioned therein a turbine wheel 20.

The compressor section 74 includes the housing 24 in which there is positioned the compressor wheel 28. As in the case of the compressor section 14, there is also a compressor flange plate 88 which assembles with the bearing housing 76 to form drain chamber 80.

The compressor section 74 includes the housing 24 in which there is positioned the compressor wheel 28. As in the case of the compressor section 14, there is also a compressor flange plate 88 which assembles with the bearing housing 76 to form drain chamber 80.

The turbine wheel 20 and the compressor wheel 28 are carried by the common shaft 30 which is mounted within the sleeve bearing 32. The seals of the turbocharger 72 are substantially the same as those of the turbocharger 10. However, the turbocharger 72 is modified to permit the mounting thereof substantially vertical with the compressor section 74 disposed lowermost. First of all, the bearing housing 76 is axially elongated as compared to the bearing housing 16. Secondly, the compressor flange plate 88 is fixedly foreshortened as compared to a like plate of the compressor section 14. The net result is that a drain chamber 80 of the turbocharger 70 is of substantially the same configuration as that of the drain chamber 44. However, the increase in axial length of the bearing housing 76 as compared to the bearing housing 16 permits the bearing housing 76 to be provided with a drain passage 82 immediately adjacent the compressor section 74. Further, that portion of the plate 78 defining the bore 54 for the thrust sleeve 52 defines an upstanding projection 84 disposed above the lubricant level 86 while the lubricant level 86 is above the drain 82. Thus, effective draining of lubricant from within the bearing housing 76 may be effected without there being a flooding of the seal 56 by lubricant within the lubricant chamber 80. In a like manner, the thrust sleeve 52 includes a slinger portion which flings oil draining from the adjacent end of the bearing 32 away from the seal and the sleeve.

The advantages of the turbocharger 70 will correspond to those set forth above with respect to the turbocharger 10. From a consideration of both FIGS. 1 and 5, it is seen that the respective dam elements 60 and 84 prevent any outflowing lubricant passing through respective passages 46 and 82 from flowing across the shaft 30 or other rotating elements, to thereby prevent any leakage of the lubricant through the shaft exit bores 50 and 54 respectively.

What is claimed is:

1. A bearing carrier comprising a housing defining a lubricant drain chamber, an elongated housing portion projecting into said drain chamber, said housing portion having ends spaced from adjacent ends of said housing, a lubricant boss connecting a radial portion only of said housing portion to said housing with remote end portions of said housing portion being otherwise completely free of said housing both axially and circumferentially, bearing means carried by said housing portion and having an open end at each end of said housing portion, a shaft rotatably journalled in said bearing means and extending through and beyond each end of said housing portion, a lubricant passage extending through said lubricant boss from the exterior of said housing to said bearing means, a lubricant drain passage opening from said lubricant drain chamber, said housing portion ends being spaced from said housing defining open space means for permitting lubricant flung from said shaft at ends of said bearing means to flow towards said lubricant drain without being directed back towards said shaft, said lubricant drain passage being disposed adjacent one end of said housing, said housing one end has an opening through which said shaft passes, and a dam forming internal projection on said housing one end extending axially inwardly of said drain chamber into axial overlapping relation to said lubricant drain passage wherein said housing may be mounted in an upstanding position without draining lubricant being redirected towards said shaft.

2. The bearing carrier of claim 1 wherein said bearing carrier is part of a turbocharger and said shaft carries a turbine wheel adjacent said dam.

3. The bearing carrier of claim 1 wherein said bearing carrier is part of a turbocharger including a compressor section, said housing adjacent said compressor section is open, and said compressor section includes a flange closing said housing open end and defining an elongation of said lubricant drain chamber.

4. A bearing carrier comprising a housing defining a lubricant drain chamber, an elongated housing portion projecting into said drain chamber, said housing portion having ends spaced from adjacent ends of said housing, a lubricant boss connecting a radial portion only of said housing portion to said housing with remote end portions of said housing portion being otherwise completely free of said housing both axially and circumferentially, bearing means carried by said housing portion and having an open end at each end of said housing portion, a shaft rotatably journalled in said bearing means and extending through and beyond each end of said housing portion, a lubricant passage extending through said lubricant boss from the exterior of said housing to said bearing means, a lubricant drain passage opening from said lubricant drain chamber, said housing portion ends being spaced from said housing defining open space means for permitting lubricant flung from said shaft at ends of said bearing means to flow towards said lubricant drain without being directed back towards said shaft, said bearing carrier being part of a turbocharger including a compressor section, said housing adjacent said compressor section being open, said compressor section including a flange closing said housing open end and defining an elongation of said lubricant drain chamber, said lubricant drain passage being disposed adjacent said flange, said flange having an opening through which said shaft passes, and a dam forming internal projection on said flange extending axially inwardly of said drain chamber into axial overlapping relation to said lubricant drain passage wherein said housing may be mounted in an upstanding position with said compressor section lowermost without draining lubricant being redirected towards said shaft.

5. A bearing carrier comprising, a housing defining a lubricant drain chamber, said housing having a central portion carrying a bearing bore to receive bearing means, said housing having an outer portion adapted to receive other machine components, said housing outer portion having a lubricant drain passage extending from said lubricant drain chamber to exterior, said lubricant drain chamber being unobstructed and open between said outer portion and said central portion except for a lubricant supply boss connecting the said housing portions, a lubricant supply passage extending through said lubricant supply boss from the exterior of said housing to said bearing bore, said housing having one open axial end for accepting a closure that extends said lubricant drain chamber and seals said open end while providing a shaft exit bore, said housing having one closed axial end with a central shaft exit bore, said central portion bearing bore being open at both remote ends, one end towards said housing open end and being completely open axially, the opposite end of said bearing bore being open to an oil drain slot communicating with said lubricant drain chamber, said oil drain slot being defined as generally circular and unobstructed in excess of 240° radially in communication with said lubricant drain chamber and located axially between one end of said central portion and the interior of the end wall of said of said housing having said shaft exit bore, a radial open distance between said housing outer portion and central portion extending generally full length axially of said housing that provides a generally unobstructed and circular drain chamber from which lubricant exiting the bearing means and rotating components when assembled into said housing can flow through said drain chamber seeking its own natural path towards said drain passage without being directed back towards the rotating shaft and its components and the respective said shaft exit bores, said housing one open axial end being assembled with a closure component, bearing means with a shaft rotatably journalled within, said shaft extending through and beyond said exit bores at both ends of said housing, said shaft having a shoulder parallel with and adjacent to said bearing bore end at said oil drain slot location, a sleeve affixed to the shaft with a shoulder parallel with and adjacent to said one bearing bore end, said lubricant drain passage being disposed adjacent one end of said housing, said housing end having a said exit bore through which said shaft passes, and a dam formed by an internal projection on said housing end extending axially inwardly of said drain chamber into axial overlapping relation to said lubricant drain passage whereby said housing may be mounted in an upstanding position with said closure side up and the exiting lubricant not flowing directly across said shaft or over the shaft exit bore, thereby preventing leakage of the lubricant through the shaft exit bore.

6. The bearing carrier of claim 5 wherein said bearing carrier is part of a turbocharger and said shaft carries a turbine wheel adjacent said housing dam.

7. A bearing carrier comprising, a housing defining a lubricant drain chamber, said housing having a central portion carrying a bearing bore to receive bearing means, said housing having an outer portion adapted to receive other machine components, said housing outer portion having a lubricant drain passage extending from said lubricant drain chamber to exterior, said lubricant drain chamber being unobstructed and open between said outer portion and said central portion except for a lubricant supply boss connecting the said housing portions, a lubricant supply passage extending through said lubricant supply boss from the exterior of said housing to said bearing bore, said housing having one open axial end for accepting a closure that extends said lubricant drain chamber and seals said open end while providing a shaft exit bore, said housing having one closed axial end with a central shaft exit bore, said central portion bearing bore being open at both remote ends, one end towards said housing open end and being completely open axially, the opposite end of said bearing bore being open to an oil drain slot communicating with said lubricant drain chamber, said oil drain slot being defined as generally circular and unobstructed in excess of 240° radially in communication with said lubricant drain chamber and located axially between one end of said central portion and the interior of the end wall of said housing having said shaft exit bore, a radial open distance between said housing outer portion and central portion extending generally full length axially of said housing that provides a generally unobstructed and circular drain chamber from which lubricant exiting the bearing means and rotating components when assembled into said housing can flow through said drain chamber seeking its own natural path towards said drain passage without being directed back towards the rotating shaft and its components and the respective said shaft exit bores, said housing one open axial end being assembled with a closure component, bearing means with a shaft rotatably journalled within, said shaft extending through and beyond said exit bores at both ends of said housing, said shaft having a shoulder parallel with and adjacent to said bearing bore end at said oil drain slot location, a sleeve affixed to the shaft with a shoulder parallel with and adjacent to said one bearing bore end, said lubricant drain passage being disposed adjacent said closure end of said housing, said closure having said exit bore through which said shaft passes, and a dam formed by an internal projection on said closure extending axially inwardly of said drain chamber into axial overlapping relation to said lubricant drain passage whereby said housing may be mounted in an upstanding position with said closure side down and the exiting lubricant not flowing directly across said rotating components, or over the shaft exit bore, thereby preventing leakage of the lubricant through the shaft exit bore.

8. The bearing carrier of claim 7 wherein said bearing carrier is part of a turbocharger and said shaft carries a compressor wheel adjacent said closure dam.

* * * * *